United States Patent

(12) United States Patent
Nishimura

(10) Patent No.: US 8,990,595 B2
(45) Date of Patent: Mar. 24, 2015

(54) POWER SUPPLY CONTROL DEVICE

(71) Applicant: Panasonic Corporation, Osaka (JP)

(72) Inventor: Seiichi Nishimura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 375 days.

(21) Appl. No.: 13/668,436

(22) Filed: Nov. 5, 2012

(65) Prior Publication Data

US 2013/0262886 A1  Oct. 3, 2013

(30) Foreign Application Priority Data

Mar. 28, 2012  (JP) ................. 2012-073218
Jul. 25, 2012   (JP) ................. 2012-164766
Oct. 3, 2012    (JP) ................. 2012-221431

(51) Int. Cl.
G06F 1/26  (2006.01)

(52) U.S. Cl.
CPC ....................... *G06F 1/26* (2013.01)
USPC .......................... 713/300; 713/320

(58) Field of Classification Search
CPC .................... G06F 1/26; G06F 1/32
USPC .............................. 713/300, 320
See application file for complete search history.

(56) References Cited

U.S. PATENT DOCUMENTS

| 5,710,959 | A * | 1/1998 | Hirooka et al. ............... 399/88 |
| 6,926,380 | B2 * | 8/2005 | Narazaki et al. ............. 347/5 |
| 7,088,017 | B2 * | 8/2006 | Motegi .......................... 307/140 |
| 7,620,831 | B2 * | 11/2009 | Takahashi ..................... 713/324 |
| 2001/0010639 | A1 * | 8/2001 | Shirato et al. ................. 363/89 |
| 2012/0218245 | A1 * | 8/2012 | Morii et al. ................... 345/211 |

FOREIGN PATENT DOCUMENTS

| JP | 60-030187 A | 7/1985 |
| JP | 62-250814 A | 10/1987 |
| JP | 11-038841 A | 2/1999 |
| JP | 2004-163509 A | 6/2004 |

* cited by examiner

*Primary Examiner* — Chun Cao
(74) *Attorney, Agent, or Firm* — Renner, Otto, Boisselle & Sklar, LLP

(57) ABSTRACT

A power supply control device includes an always powered section and a selectively powered section. The always powered section includes a switch determining whether or not to supply external power to the selectively powered section, a first memory circuit storing information for turning on/off the switch, and a second memory circuit storing information on a change in a main power supply switch. The selectively powered section includes a power supply circuit supplying power to the device body, a non-volatile memory configured to storing information on an on/off-state of the device body, and a control section changing the information in the first memory circuit in accordance with the information in the non-volatile memory and the second memory circuit.

2 Claims, 2 Drawing Sheets

FIG.2

| | | EXTERNAL POWER SUPPLY | |
| --- | --- | --- | --- |
| | | ON | OFF |
| POWER SUPPLY SWITCH 12 | ON | OPERATION —(C)→ ←(D)— | STOP (POWER FAILURE) |
| | OFF | (A)↑ ↓(B) STOP (NORMAL) —(E)→ ←(F)— | STOP (POWER FAILURE) |

POWER SUPPLY CONTROL DEVICE

CROSS-REFERENCE TO RELATED APPLICATION

This application claims priority to Japanese Patent Application No. 2012-073218 filed on Mar. 28, 2012, Japanese Patent Application No. 2012-164766 filed on Jul. 25, 2012, and Japanese Patent Application No. 2012-221431 filed on Oct. 3, 2012, the disclosure of which including the specification, the drawings, and the claims is hereby incorporated by reference in its entirety.

BACKGROUND

The present disclosure relates to power supply control devices capable of reducing power consumption.

Japanese Patent Publication No. S62-250814 teaches setting, in advance, the on/off-state of a power supply of a power supply control device after recovery from power failure, and bringing the state of the power supply to a predetermined state after the recovery from the power failure. As such, the state of the power supply after the recovery from the power failure can be set as desired.

SUMMARY

The present disclosure provides a power supply control device capable of reducing power consumption while maintaining the on/off-state of a power supply before and after power failure.

A power supply control device according to the present disclosure controls power supplied to a device body. The device includes an always powered section coupled to an external power supply; and a selectively powered section to which external power is supplied from the always powered section while the device body operates. The always powered section includes a switch configured to determine whether or not to supply the external power to the selectively powered section, a first memory circuit configured to store information for turning on/off the switch, and to set the information to information for turning on the switch when supply of the external power to the always powered section starts or when a main power supply switch for booting the device body is depressed, and a second memory circuit configured to store information on an on/off change of the main power supply switch, and to store information that there is no on/off change of the main power supply switch when the supply of the external power to the always powered section starts. The switch is turned on/off in accordance with the information in the first memory circuit. The selectively powered section includes a power supply circuit configured to generate the power from the external power supplied from the always powered section, and to supply the generated power to the device body, a non-volatile memory configured to store information on an on/off-state of the device body, and a control section configured to operate on the supplied power, to determine the on/off-state of the device body based on the information stored in the non-volatile memory and the information stored in the second memory circuit, and to change the information in the first memory circuit in accordance with a determination result.

The power supply control device according to the present disclosure reduces power consumption while maintaining the on/off-state of a power supply before and after power failure.

BRIEF DESCRIPTION OF THE DRAWINGS

FIG. 2 is a state transition diagram illustrating operation of the power supply control device according to the first embodiment.

DETAILED DESCRIPTION

Figure 1:
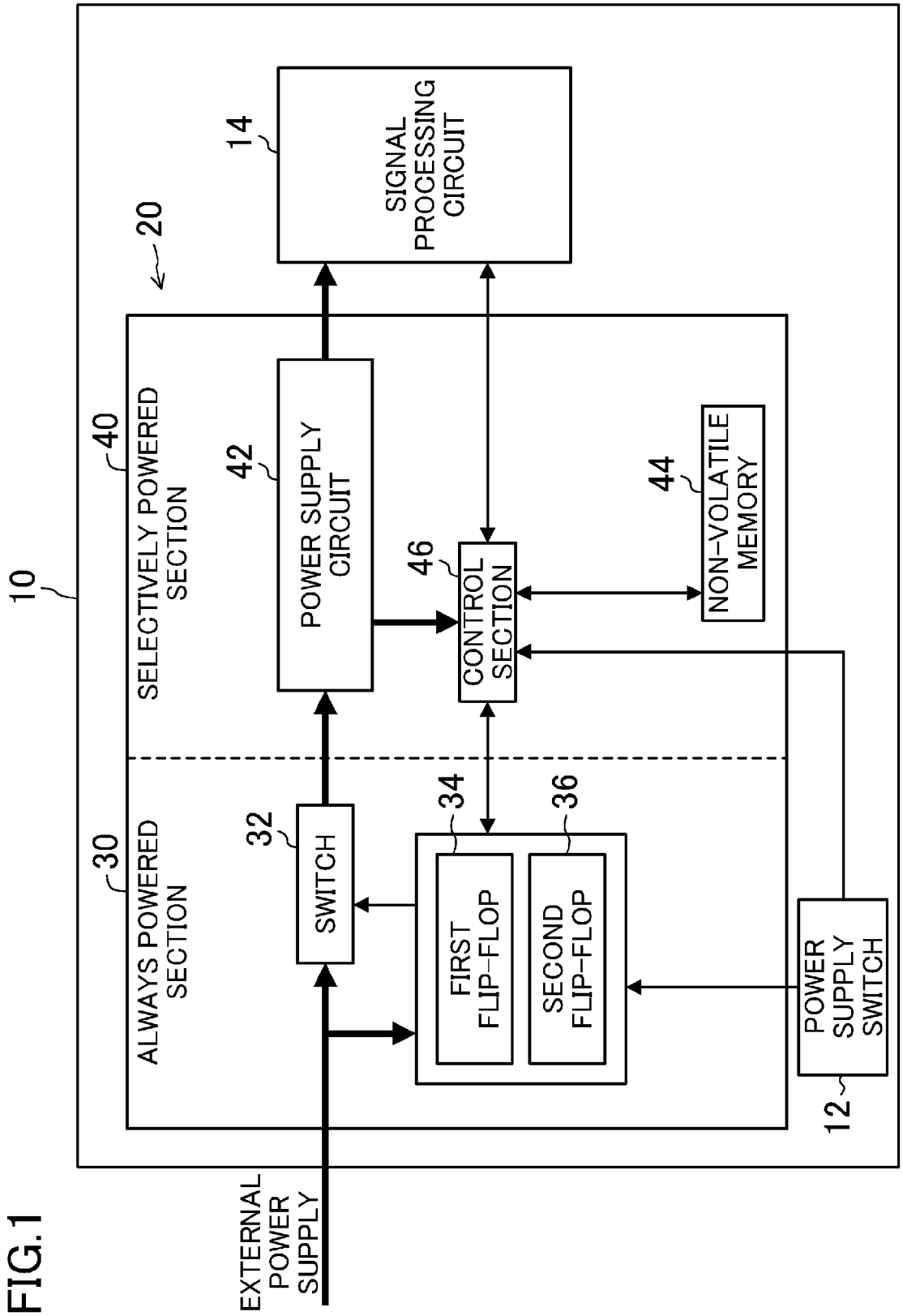
FIG. 1 is a block diagram illustrating the configuration of a device body including a power supply control device according to the first embodiment.

Embodiments are described in detail below with reference to the attached drawings. However, unnecessarily detailed description may be omitted. For example, detailed description of well known techniques or description of the substantially same elements may be omitted. Such omission is intended to prevent the following description from being unnecessarily redundant and to help those skilled in the art easily understand it.

Inventor provides the following description and the attached drawings to enable those skilled in the art to fully understand the present disclosure. Thus, the description and the drawings are not intended to limit the scope of the subject matter defined in the claims.

First Embodiment

A first embodiment will be described below with reference to FIGS. 1 and 2.

Configuration

Configuration of Device body

FIG. 1 is a block diagram illustrating the configuration of a device body including a power supply control device according to the first embodiment. A device body 10 of FIG. 1 is, for example, electronic equipment such as a monitor. The device body 10 includes a push-button power supply switch 12 (hereinafter referred to as a power supply switch 12) as a main power supply switch, a signal processing circuit 14, and a power supply control device 20.

The power supply switch 12 is not a seesaw switch storing the on/off-state, but a switch switching between the on and off-states of the device body 10 by depressing a button. An on-state of the device body 10 means that power is supplied to the device body 10 from a power supply control device 20 so that the device body 10 normally operates. For example, an image is displayed on a monitor. An off-state of the device body 10 means that supply of power is stopped and the normal operation of the device body 10 is stopped.

The signal processing circuit 14 is a conventional circuit which is mounted in electronic equipment for signal processing for, for example, displaying an image on a monitor, and performs various processing. The signal processing circuit 14 operates on the power supplied from the power supply control device 20. The signal processing circuit 14 may include a circuit for a purpose other than the signal processing.

Configuration of Power Supply Control Device

The power supply control device 20 includes an always powered section 30 coupled to an external power supply, and a selectively powered section 40 to which external power is supplied from the always powered section 30 while the device body 10 operates.

The always powered section 30 includes a switch 32, a first flip-flop 34 as a first memory circuit, and a second flip-flop 36 as a second memory circuit.

The switch 32 is turned on/off in accordance with information stored in the flip-flop 34, and determines whether or not to supply external power to the selectively powered section 40. Therefore, the on/off-state of the device body 10 can be selected by the switch 32.

When external power is supplied, the flip-flop 34 stores information for turning on/off the switch 32. The information in the flip-flop 34 is initialized to information for turning on the switch 32 when supply of the external power starts. In addition, the flip-flop 34 detects that the power supply switch 12 is depressed, and sets the stored information to the information for turning on the switch 32. For example, the switch 32 is turned on when the information of the flip-flop 34 indicates 1, and turned off when the information indicates 0.

When external power is supplied, the flip-flop 36 stores information on an on/off change in the power supply switch 12. That is, the flip-flop 36 stores information indicating whether or not the power supply switch 12 is depressed. When supply of the external power starts, the information in the flip-flop 36 is initialized to information indicating that the power supply switch 12 is not depressed. For example, the information in the flip-flop 36 indicates 1 when the power supply switch 12 has been depressed. The information indicates 0 while the power supply switch 12 has not been depressed.

The selectively powered section 40 includes a power supply circuit 42, a non-volatile memory 44, and a control section 46.

The power supply circuit 42 is, for example, a switching regulator, which transforms the external power supplied from the always powered section 30, and supplies the transformed power to the signal processing circuit 14 and the control section 46.

The non-volatile memory 44 stores, based on the output of the control section 46, information indicating whether or not the power is supplied to the device body 10 so that the device body 10 normally operates, i.e., whether the device body 10 is powered on or off The control section 46 controls the power supply in response to the power supplied from the power supply circuit 42. Specifically, the control section 46 detects whether or not the power supply switch 12 is depressed. The control section 46 determines the on/off-state of the device body 10 based on the information in the non-volatile memory 44 and the information in the flip-flop 36.

Having determined that the device body 10 is in the on-state, the control section 46 sets the information in the flip-flop 34 to the information for turning on the switch 32. On the other hand, having determined that the device body 10 is in the off-state, the control section 46 sets the information in the flip-flop 34 to the information for turning off the switch 32. When the device body 10 starts and stops, the control section 46 clears the information in the flip-flop 36 to be the information indicating that the power supply switch 12 is not depressed.

The control section 46 also controls the operation of the signal processing circuit 14, and controls the flip-flop 34 and the non-volatile memory 44 in response to a signal from the signal processing circuit 14.

The above-described non-volatile memory 44 and control section 46 may be included in the signal processing circuit 14. The control section 46 may be provided in any circuit, as long as power is supplied to the circuit from the power supply circuit 42.

Operation of Power Supply Control Device

The operation of the power supply control device 20 having the above-described configuration will be described below.

FIG. 2 is a state transition diagram illustrating the operation of the power supply control device according to this embodiment.

First, an example will be described where external power is supplied to the always powered section 30. When the power supply switch 12 is off, the switch 32 is also off. That is, the device body 10 is in the off-state. Thus, the non-volatile memory 44 stores the information indicating that the device body 10 is in the off-state.

When the power supply switch 12 is depressed in this state, the state of the device body 10 transits as indicated by the arrow (A) in FIG. 2.

Specifically, the flip-flop 34 detects that the power supply switch 12 is depressed, and stores the information for turning on the switch 32. As a result, the switch 32 is turned on, external power is supplied to the power supply circuit 42 and power is supplied from the power supply circuit 42 to the control section 46 and the signal processing circuit 14. In accordance with the depression of the power supply switch 12, the flip-flop 36 stores the information indicating that the power supply switch 12 is depressed.

The control section 46 operates on the power supplied from the power supply circuit 42, and refers to the information stored in the flip-flop 36 and the non-volatile memory 44. The flip-flop 36 stores the information indicating that the power supply switch 12 is depressed. The non-volatile memory 44 stores the information indicating that the device body 10 is in the off-state. Since the power supply switch 12 is depressed, the control section 46 determines that the device body 10 is activated, and executes a boot sequence for transiting the device body 10 to a normal operation mode, i.e., the on-state.

In the boot sequence, the control section 46 holds the information stored in the flip-flop 34, while clearing the information stored in the flip-flop 36. The control section 46 sets the information stored in the non-volatile memory 44 to the information indicating that the device body 10 is in the on-state. After that, the device body 10 comes to the on-state, and the control section 46 controls the operation of the signal processing circuit 14 in accordance with the function of the device body 10.

When the power supply switch 12 is continuously depressed while the device body 10 is in the on-state and, the state of the device body 10 transits as indicated by the arrow (B) in FIG. 2.

Specifically, the control section 46 detects that the power supply switch 12 is continuously depressed, and sets the information stored in the non-volatile memory 44 to the information indicating that the device body 10 is in the off-state. The flip-flop 36 stores the information indicating that the power supply switch 12 is depressed, which is cleared by the control section 46.

Then, the control section 46 sets the information stored in the flip-flop 34 to the information for turning off the switch 32. This turns off the switch 32 to stop supply of external power to the power supply circuit 42 and supply of power from the power supply circuit 42 to the signal processing circuit 14 and the control section 46. As a result, the device body 10 transits to a normal stop mode, i.e., the off-state.

Next, an example will be described where supply of external power is stopped by power failure. When power failure occurs while the device body 10 is in the on-state, the state of the device body 10 transits as indicated by the arrow (C) in FIG. 2. That is, the device body 10 transits from the on-state to a stop mode due to the power failure.

Since the device body 10 is the on-state before the power failure, the non-volatile memory 44 stores the information indicating that the device body 10 is in the on-state. If power failure occurs in this state, supply of external power to the always powered section 30 and supply of power to the signal processing circuit 14 and the control section 46 are stopped, and thus the device body 10 transits to a stop mode.

Then, after recovery from power failure, the state of the device body 10 transits as indicated by the arrow (D) in FIG. 2.

Specifically, when supply of external power to the always powered section 30 starts after recovery from the power failure, the information in the flip-flop 34 is initialized to the information for turning on the switch 32, and the information in the flip-flop 36 is initialized to the information indicating that the power supply switch 12 is not depressed.

The information in the flip-flop 34 turns on the switch 32, then external power is supplied to power supply circuit 42, and power is supplied from the power supply circuit 42 to the signal processing circuit 14 and the control section 46. As a result, the control section 46 starts operating and refers to the information in the flip-flop 36 and the non-volatile memory 44.

The information in the flip-flop 36 indicates that the power supply switch 12 is not depressed, and the information in the non-volatile memory 44 indicates that the device body 10 is in the on-state. Thus, the control section 46 determines that the device body 10 needs to be in the on-state, and holds the information in the flip-flop 34. Then, the switch 32 remains powered on, and power is continuously supplied from the power supply circuit 42 to the signal processing circuit 14 and the control section 46. As a result, the above-described boot sequence is executed so that the device body 10 is in the on-state.

When power failure occurs while the device body 10 is in the off-state, the state of the device body 10 transits as indicated by the arrow (E) in FIG. 2. That is, the device body 10 transits from the off-state to a stop mode due to the power failure.

Since the device body 10 is in the off-state before the power failure, the non-volatile memory 44 stores the information indicating that the device body 10 is in the off-state. If the power is recovered in this state, the state of the device body 10 transits as indicated by the arrow (F) in FIG. 2.

Specifically, when supply of external power to the always powered section 30 starts after recovery from the power failure, the information in the flip-flop 34 is initialized to the information for turning on the switch 32, and the information in the flip-flop 36 is initialized to the information indicating that the power supply switch 12 is not depressed.

The information in the flip-flop 34 turns on the switch 32, and external power is supplied to the power supply circuit 42, and power is supplied from the power supply circuit 42 to the signal processing circuit 14 and the control section 46. As a result, the control section 46 starts operating and refers to the information in the flip-flop 36 and the non-volatile memory 44.

The information in the flip-flop 36 indicates that the power supply switch 12 is not depressed. The information in the non-volatile memory 44 indicates that the device body 10 is in the off-state. Thus, the control section 46 determines that the device body 10 needs to be in the off-state, and changes the information in the flip-flop 34 to the information for turning off the switch 32. This turns off the switch 32, and stops supply of external power to the power supply circuit 42. As a result, the signal processing circuit 14 and the control section 46 are stopped so that the device body 10 is in the off-state. Note that power is supplied from the power supply circuit 42 to the control section 46 and the signal processing circuit 14, thereby supplying power to the device body 10. Before the control section 46 determines that the device body 10 needs to be in the off-state, no indication or function appears on the device body 10. Therefore, users do not determine that the device body 10 has malfunction.

Advantages

As described above, in this embodiment, the on/off-state of the device body 10 can be maintained before power failure and after recovery from the power failure. That is, in the power supply control device 20 according to this embodiment, if external power is recovered from the power failure etc., the flip-flop 34 stores the information for turning on the switch 32 due to start of supply of the external power. This turns on the switch 32, and the power supply circuit 42 generates power. On this power, the device body 10 and the control section 46 operate.

For example, when power failure occurs while the device body 10 in normal operation, i.e., the device body 10 is in the on-state, and then power is recovered, the non-volatile memory 44 stores the information indicating that the device body 10 is in the on-state. The information in the flip-flop 36 indicates that there is no on/off change in the power supply switch 12. The control section 46 determines based on the information that the device body 10 was in the on-state before the power failure, and sets the information in the flip-flop 34 to the information for turning on the switch 32 based on the determination. That is, since the information in the flip-flop 34 is held, the switch 32 is turned on so that the device body 10 continues operation in the on-state, which is the state before the power failure, after the recovery from the power failure.

On the other hand, when power failure occurs while the device body 10 is in the off-state and then power is recovered, the non-volatile memory 44 stores the information indicating that the device body 10 is in the off-state. The information in the flip-flop 36 indicates that there is no on/off change in the power supply switch 12. The control section 46 determines based on the information that the device body 10 was in the off-state before the power failure, and changes the information in the flip-flop 34 to the information for turning off the switch 32 based on the determination. As a result, the switch 32 is turned off to stop supply of external power to the power supply circuit 42. Therefore, the operation of the device body 10 and the control section 46 stops, and the device body 10 remains in the off-state which is the state before the power failure.

Where the power supply switch used for the device body is a seesaw switch which physically stores an on/off state, the state of the device body after recovery from power failure depends on the on/off-state of the seesaw switch. Therefore, it is considered easy to set the state of the device body after power failure to the same state as the state before the power failure by using a seesaw switch.

However, for example, when the seesaw switch is on, the device body is automatically powered down and comes to the off-state. Then, if power failure occurs and the power is recovered, the device body needs to be in the off-state at the recovery. However, since the seesaw switch is on, the power is recovered while the device body is in the on-state. That is, the device body is in different states before the power failure and after the recovery of the power failure.

On the other hand, where a power supply switch not storing an on/off state is used for the device body instead of a seesaw switch, a power supply control device often includes a dedicated sub-microprocessor for controlling power supply, in addition to a control section for controlling the operation of the device body. The sub-microprocessor for controlling power supply maintains the on/off-state of the device body before power failure and after recovery from the power failure. However, external power needs to be always supplied to such a sub-microprocessor, and thus power consumption may increase even when the device body is stopped (stands by). That is, standby energy may increase.

By contrast, in this embodiment, the always powered section 30, to which external power is supplied, includes the two flip-flops 34 and 36. The control section 46 included in the selectively powered section 40 controls the above-described power supply and the operation. Thus, a sub-microprocessor for controlling the power supply is not required, thereby reducing costs. In addition, a flip-flop requires lower power consumption than a sub-microprocessor, thereby reducing standby energy.

Other Embodiments

As described above, the first embodiment has been described as example techniques disclosed in the present application. However, the techniques according to the present disclosure are not limited to these embodiments, but are also applicable to those where modifications, substitutions, additions, and omissions are made. In addition, elements described in the first embodiment may be combined to provide a different embodiment.

While, in the first embodiment, an example has been described where the first and second memory circuits are flip-flops, for example, shift registers or latches may be used. Alternatively, the first and second memory circuits may be volatile memories. That is, the first and second memory circuits may be any element storing a logical value. As described in the first embodiment, costs can be reduced by using the flip-flops 34 and 36.

The power supply switch 12 may not be a push button but a toggle. The power supply switch 12 may be any switch not storing an on/off-state.

The switch 32 may be, for example, a field-effect transistor or a single stable relay.

With respect to the control of power supply in the first embodiment, an example has been described where the state of the device body 10 is transited from on to off by depressing the power supply switch 12 (see the arrow (B) in FIG. 2). However, the state may be changed to off by automatically powering down the device body 10. For example, the control section 46 may include a timer and performs control for a state transition indicated by the arrow (B) in FIG. 2, when the timer detects that a predetermined time has passed. Alternatively, if the signal processing circuit 14 has performed no processing for a predetermined time, the control section 46 may perform control for a state transition indicated by the arrow (B) in FIG. 2 in response to a signal from the signal processing circuit 14.

Various embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiment described above is intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

The present disclosure is applicable to a power supply control device used for various types of electronic equipment requiring lower power consumption of standby energy. Specifically, the present disclosure is applicable to various types of electronic equipment such as a monitor, a television, and a PC which operates on external power.

What is claimed is:

1. A power supply control device controlling power supplied to an device body, the device comprising:
    an always powered section coupled to an external power supply; and
    a selectively powered section to which external power is supplied from the always powered section while the device body operates, wherein
    the always powered section includes
        a switch configured to determine whether or not to supply the external power to the selectively powered section,
        a first memory circuit configured to store information for turning on/off the switch, and to set the information to information for turning on the switch when supply of the external power to the always powered section starts or when a main power supply switch for booting the device body is depressed, and
        a second memory circuit configured to store information on an on/off change of the main power supply switch, and to store information that there is no on/off change of the main power supply switch when the supply of the external power to the always powered section starts,
    the switch is turned on/off in accordance with the information in the first memory circuit,
    the selectively powered section includes
        a power supply circuit configured to generate the power from the external power supplied from the always powered section, and to supply the generated power to the device body,
        a non-volatile memory configured to store information on an on/off-state of the device body, and
        a control section configured to operate on the supplied power, to determine the on/off-state of the device body based on the information stored in the non-volatile memory and the information stored in the second memory circuit, and to change the information in the first memory circuit in accordance with a determination result.

2. The power supply control device of claim 1, wherein the first and second memory circuits are flip-flops.

* * * * *